United States Patent
Goetz et al.

(10) Patent No.: US 12,380,482 B1
(45) Date of Patent: *Aug. 5, 2025

(54) SYSTEMS AND METHODS FOR MONITORING A BUDGET SCOPE IN REAL TIME

(71) Applicant: Wells Fargo Bank, N.A., San Francisco, CA (US)

(72) Inventors: Darren M. Goetz, Salinas, CA (US); Dennis E. Montenegro, Concord, CA (US); Alicia Y. Moore, San Ramon, CA (US); Timothy R. Ward, Mesa, AZ (US)

(73) Assignee: Wells Fargo Bank, N.A., San Francisco, CA (US)

(*) Notice: Subject to any disclaimer, the term of this patent is extended or adjusted under 35 U.S.C. 154(b) by 178 days.

This patent is subject to a terminal disclaimer.

(21) Appl. No.: 18/079,207

(22) Filed: Dec. 12, 2022

Related U.S. Application Data

(63) Continuation of application No. 16/582,966, filed on Sep. 25, 2019, now Pat. No. 11,526,921.

(51) Int. Cl.
G06Q 30/00 (2023.01)
G06Q 30/0601 (2023.01)
G06Q 40/12 (2023.01)

(52) U.S. Cl.
CPC ..... *G06Q 30/0627* (2013.01); *G06Q 30/0641* (2013.01); *G06Q 40/125* (2013.12)

(58) Field of Classification Search
None
See application file for complete search history.

(56) References Cited

U.S. PATENT DOCUMENTS

| | | | |
|---|---|---|---|
| 8,060,411 B2 | 11/2011 | Shestakov et al. | |
| 8,239,276 B2 | 8/2012 | Lin et al. | |
| 8,473,380 B2 | 6/2013 | Thomas et al. | |
| 8,538,827 B1* | 9/2013 | Dryer | G06Q 30/00 705/26.1 |
| 8,849,706 B2 | 9/2014 | King | |
| 9,495,703 B1 | 11/2016 | Kaye, III | |

(Continued)

OTHER PUBLICATIONS

David; Koch, Libby; "Budgeting App How To Pocket Extra Savings"; Jul. 15, 2013; Nationwide News Pty Ltd (Year: 2013).*

(Continued)

*Primary Examiner* — Anand Loharikar
(74) *Attorney, Agent, or Firm* — Foley & Lardner LLP

(57) ABSTRACT

Systems, methods, and apparatuses include a provider computing system including a network interface structured to facilitate data communication via a network and a processing circuit comprising a processor and memory. The processing circuit is structured to receive a scope and a budget. The processing circuit includes a management circuit structured to determine a scope merchant category for items offered for sale by a merchant that match the scope and wherein the management circuit is structured to interpret the budget to determine a maximum amount of funds for the purchase. The processing circuit receives a selected item. The management circuit determines a category in comparison to the scope and a cost item in comparison to the budget to determine if the cost of the item is less than the maximum amount of funds.

20 Claims, 7 Drawing Sheets

(56) References Cited

U.S. PATENT DOCUMENTS

| | | | |
|---|---|---|---|
| 9,972,038 | B2 | 5/2018 | Godsey et al. |
| 10,157,403 | B1 | 12/2018 | Fuzell-Casey et al. |
| 10,216,280 | B2 | 2/2019 | Levesque et al. |
| 2007/0125840 | A1 | 6/2007 | Law |
| 2011/0320294 | A1 | 12/2011 | Votaw et al. |
| 2012/0084164 | A1 | 4/2012 | Hammad et al. |
| 2012/0197793 | A1 | 8/2012 | Grigg et al. |
| 2013/0030994 | A1 | 1/2013 | Calman et al. |
| 2013/0325668 | A1 | 12/2013 | Fischburg |
| 2014/0136365 | A1* | 5/2014 | Nista ............ G06Q 30/06 705/26.1 |
| 2014/0164175 | A1 | 6/2014 | Kitlyar |
| 2014/0172559 | A1* | 6/2014 | Calman ............ G06Q 20/3224 705/26.9 |
| 2014/0172621 | A1 | 6/2014 | Vittolia |
| 2014/0214623 | A1 | 7/2014 | Cancro et al. |
| 2014/0249916 | A1 | 9/2014 | Verhaeghe |
| 2014/0299659 | A1* | 10/2014 | Masuko ............ G06Q 30/0281 235/375 |
| 2015/0112821 | A1 | 4/2015 | Giacometti |
| 2015/0112826 | A1 | 4/2015 | Crutchfield, Jr. |
| 2015/0112838 | A1* | 4/2015 | Li ............ G06Q 30/0623 705/26.61 |
| 2015/0379601 | A1 | 12/2015 | Ouimet |
| 2016/0005098 | A1 | 1/2016 | Flynn et al. |
| 2016/0048928 | A1 | 2/2016 | Davis et al. |
| 2016/0165312 | A1 | 6/2016 | Ochiai et al. |
| 2016/0247237 | A1 | 8/2016 | Grigg et al. |
| 2016/0253702 | A1 | 9/2016 | Gonzales, Jr. |
| 2016/0292770 | A1* | 10/2016 | Alselimi ............ G06Q 30/0631 |
| 2016/0314465 | A1* | 10/2016 | Martin ............ G06Q 20/20 |
| 2017/0161709 | A1* | 6/2017 | Tunnell ............ G06Q 20/401 |
| 2017/0200158 | A1* | 7/2017 | Honey ............ G06Q 20/403 |
| 2017/0302550 | A1 | 10/2017 | Leemet et al. |
| 2018/0005302 | A1 | 1/2018 | Ouimet et al. |
| 2018/0107994 | A1 | 4/2018 | Anderson et al. |
| 2018/0150892 | A1 | 5/2018 | Waldron et al. |
| 2018/0330373 | A1 | 11/2018 | Jansson |
| 2019/0007381 | A1 | 1/2019 | Isaacson et al. |
| 2019/0171975 | A1* | 6/2019 | Kurian ............ G06Q 30/0631 |

OTHER PUBLICATIONS

Qin, Zheng, "Introduction to E-commerce", 2009, Springer, retrieved Nov. 22, 2021 from http://196.223.158.148/bitstream/handle/123456789/1286/176.pdf?sequence=1&isAllowed=y.

* cited by examiner

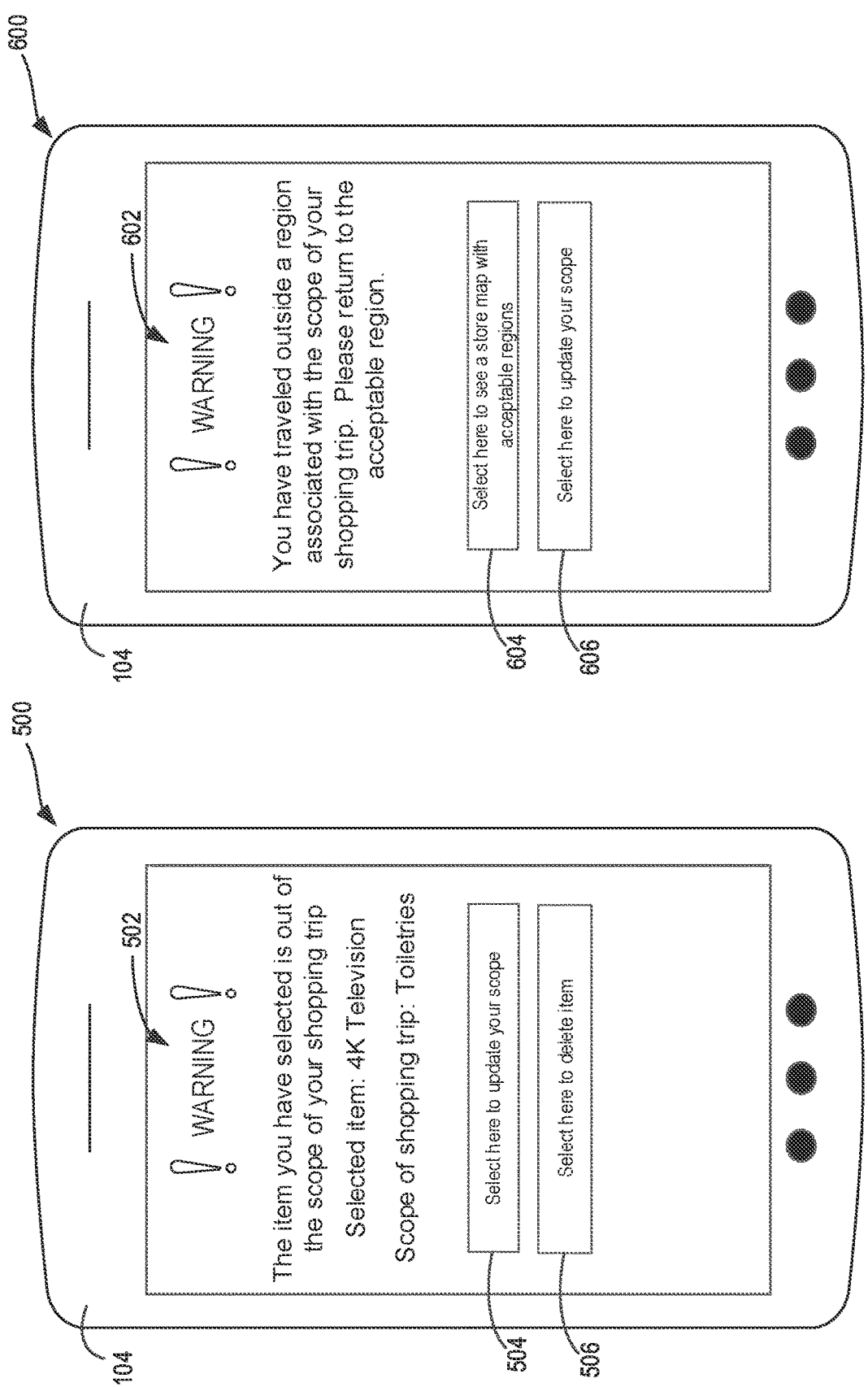

SYSTEMS AND METHODS FOR MONITORING A BUDGET SCOPE IN REAL TIME

CROSS-REFERENCE TO RELATED APPLICATIONS

This application is a continuation of U.S. patent application Ser. No. 16/582,966 filed Sep. 25, 2019 (now U.S. Pat. No. 11,526,921), the entirety of which is hereby incorporated by reference.

TECHNICAL FIELD

Embodiments of the present disclosure relate generally to the field of managing budgets and scopes associated therewith in real-time.

BACKGROUND

As part of managing personal finances, many individuals establish budgets for various expenditures to ensure that the individual does not spend more than the allocated funds. The budgets can include categories for expenditures such as food, clothing, leisure, rent, and the like. With retailers having store locations providing many different items, patrons of the retailers can typically visit one store to purchase most of the desired items. However, with large stores offering a variety of different items to purchase, it can be difficult to manage the expenditures of different budgets based on purchases of different items. Further, it can be difficult to abide by such budgets when shopping at such retail locations due to the variety of intriguing items to purchase.

SUMMARY

A first example embodiment relates to a provider computing system associated with a provider. The provider computing system includes a network interface circuit structured to facilitate data communication via a network, a processing circuit comprising a processor and memory, the processing circuit structured to receive a scope and a budget from a user device. The scope and the budget relate to a purchase. The processing circuit includes a management circuit structured to determine a scope merchant category for items offered for sale by a merchant that match the scope and wherein the management circuit is structured to interpret the budget to determine a maximum amount of funds available for the purchase. The processing circuit is configured to receive a selection of an item offered for sale by the merchant. The management circuit is structured to determine an item merchant category and to compare the item merchant category of the item to the scope merchant category and to determine a cost of the item and to compare the cost of the item to the budget to determine if the cost of the item is less than or equal to the maximum amount of funds available for purchase.

In various embodiments, the management circuit is structured to generate a warning if the item merchant category of the item is not within the scope merchant category. In some arrangements, the management circuit is structured to generate a warning if the cost of the item is greater than the maximum amount of funds available for purchase. The system may further comprise an account linkage circuit structured to recommend at least one financing option. The at least one financing option is determine based on a value difference between the cost of the item and the maximum amount of funds available for purchase. The management circuit may be structured to determine a particular user associated with the selection of the item, wherein the particular user is at least one account holder associated with a multiple holder account determined by the account linkage circuit.

In some arrangements, the management circuit is structured to recommend an upgrade of the item if the cost of the item is less than the maximum amount of funds available for purchase. The management circuit can be structured to determine a remaining amount associated with the maximum amount of funds available for purchase, wherein the remaining amount is determined by subtracting the cost of the item from the maximum amount of funds available for purchase.

Another example embodiment relates to a computer-implemented method. The method includes receiving, by a provider computing system, a scope defining a scope merchant category for items offered for sale that match the scope, receiving, by the provider computing system, a budget defining a maximum amount of funds available for the user to spend on the scope merchant category, determining, by the provider computing system, if a selected item by the user is within the scope merchant category and a cost of the selected item is equal to or less than the maximum amount of funds available, issuing, by the provider computing system, at least one warning indicating a particular item selected by the user does not fall within the scope merchant and the cost of the selected item is greater than the maximum amount of funds available, and recommending, by the provider computing system, one or more alternate solutions to the user, wherein the one or more alternate solutions are at least within the scope merchant category and at least equal to or less than the maximum amount of funds available.

In various arrangements, the method further comprises linking the scope and the budget to a financial account of the user of a user device. Recommending one or more alternate solutions to the user may comprise recommending at least one financing option, wherein the at least one financing option is determined based on a value difference between a cost of the item and the maximum amount of funds available.

In some embodiments, the method involves recommending an upgrade of the item if a cost of the item is less than the maximum amount of funds available. The method can further involve determining a remaining amount associated with the budget, wherein the remaining amount is determined by subtracting a cost of the item from the maximum amount of funds available.

In some arrangements, the method can further involve determining a particular user associated with a selection of the selected item, wherein the particular user is at least one account holder associated with a multiple holder account determined by an account linkage circuit.

Yet another example embodiment relates to a user device associated with a user. The user device comprises a network interface structured to facilitate data communication via a network and a processing circuit comprising a processor and memory. The processing circuit is structured to transmit information to at least one of a provider computing system and a retailer computing system. The information comprises at least one scope and a budget. The processing circuit comprises a client application circuit structured to generate the at least one scope and the budget associated with each of the at least one scope, wherein each of the at least one scope defines a scope merchant category to which a maximum amount of funds available defined by the budget is allocated to. The processing circuit also includes a provider application circuit structured to receive the at least one scope and the budget associated with each of the at least one scope, wherein the provider application circuit is configured to link an account associated with the user of the user device. The user device also includes a location position sensor structured to collect location information of the user device and an input device structured to facilitate user interaction with the user device.

In various arrangements, the client application circuit is structured to receive the location information to determine a location of the user device in a retailer location. In various arrangements, the client application circuit is structured to transmit a notification based on determining that the user device is located outside an acceptable region within the retailer location. In some arrangements, the client application circuit is structured to receive product data indicating items from the input device and determine if each of the items are within the scope. In some embodiments, the client application circuit is structured to transmit a notification based on determining that the item is outside of the scope.

In various embodiments, the provider application circuit is structured to receive a signal indicating a transaction and determines a correlated scope to which the transaction relates. In some arrangements, the provider application circuit is structured to determine an expenditure correlating to each account holder of a joint-holder account related to the scope defining an amount spent by a particular account holder.

BRIEF DESCRIPTION OF THE FIGURES

FIG. 5 is a schematic drawing depicting a first example user interface of the user device in the system of FIG. 1 for violating a scope, according to an example embodiment.

FIG. 6 is a schematic drawing depicting a second example user interface of the user device in the system of FIG. 1 for violating a scope, according to an example embodiment.

DETAILED DESCRIPTION

Figure 1:
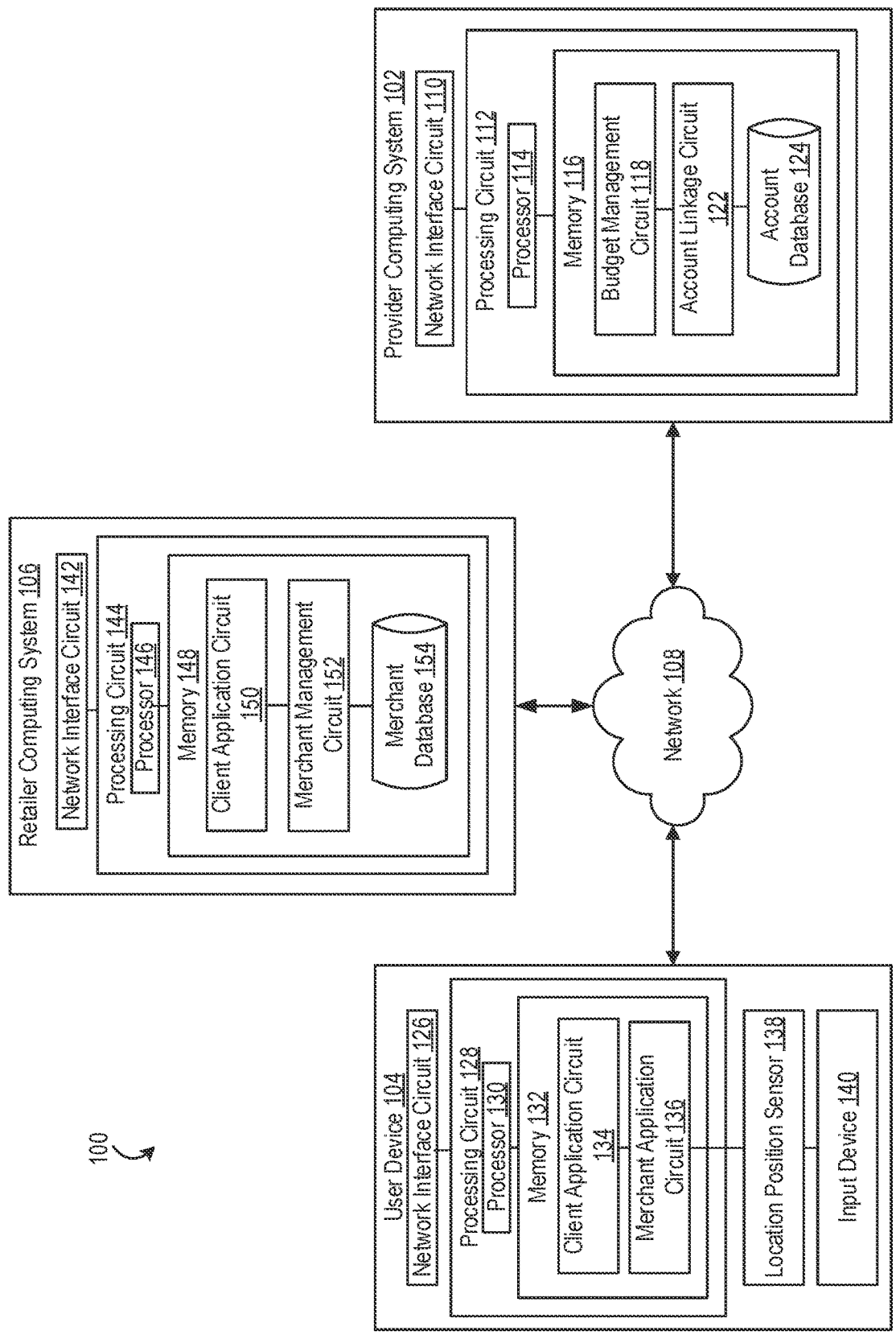
FIG. 1 is a block diagram depicting a system for generating and managing budgets and scopes associated with the budgets, according to an example embodiment.

Referring to the FIGURES generally, various systems, apparatuses, and methods of generating and managing budgets and scopes associated with the budgets are described herein. While planning a trip to retailer location such as a supermarket, a convenience store, or a mall, a customer of a retailer can set a budget defining a maximum amount of money that he/she desires to spend and a scope defining a general category of items or one or more specific items he/she desires to purchase. Further, the customer can link such a budget with a financial account that he/she holds with a financial entity. Various features can be presented when linking a budget to a financial account such as the ability to monitor financial information (e.g., income, savings, average expenditures) to determine budget feasibility (e.g., whether the amount of money defined by the budget is financially reasonable compare to the financial information), credit information, and the like.

Another exemplary implementation of the various systems, apparatuses, and methods described herein includes generating and managing budgets and scopes associated with the budgets for financial accounts of joint-holder accounts. In such accounts, multiple account holders have access to the funds in the account. The systems and methods described herein provide a solution of managing expenditures by each of the account holders as the expenditures relate to individual scopes and/or budgets. Advantageously, the systems and methods described herein solve the complexities of generating and managing multiple budgets. Further, the implementation of a budget and scope generation/monitoring system allows for users to be notified when they are tempted to purchase items that are not within the budget and/or scope. As used herein, the term "budget" is defined as an amount of funds allocated to a certain category of expenditures (e.g., items, goods, services). Accordingly, as used herein, the term "scope" is defined as a category of items to which a budget is assigned.

As an overview, the budget and scope generation and budget management system described herein can operate as follows. A user uses a user device (e.g., a mobile phone, a personal computer, a store kiosk, a smart shopping cart) to generate a shopping trip plan. As part of generating the shopping trip plan, scope and budget information is received by the provider computing system. The scope information may include information such as a list of one or items that user wishes to purchase, a scope merchant category for each of the one or more items the user wishes the purchase, and/or location of the one or more items within a store. As such, the scope information defines a scope of the shopping trip comprising one or more acceptable items or scope merchant category of items that the user intends to purchase, acceptable locations (e.g., aisles, sections of the store, a predefined path) that the user may travel through to retrieve the corresponding items or scope merchant category of items defined by the scope, etc. The budget information may include information such as an amount of funds the user allocated to the scope, a maximum cost that the user wishes to spend on a particular item, a maximum cost the user wishes to spend on a particular scope merchant category of items, financial account information of the user.

As the user executes his/her shopping trip, the budget and scope generation and management system continuously or intermittently (e.g., every 5 seconds, every minute, every 10 minutes) monitors the location of the user and/or items that the user may have selected for purchase to determine if the user is in an acceptable location within the store and/or if the user has selected an acceptable item (both of which are defined by the scope of the shopping trip). If it is determined that the current location and/or selected item does not fall within the scope, then a warning may be generated, such as an audible or visual warning via a user device, alerting the user that the location and/or selected item is out of the scope of the shopping trip. Accordingly, alternate solutions may be presented to the user via the user device such as an option to add an additional scope to the shopping trip and/or an optimal route for the user to take to return to an acceptable location within the store). If it is determined that the current location and/or selected item falls within the scope, then no warning may be issued by the budget and scope generation and management system.

The budget and scope generation and management system also continuously or intermittently (e.g., every 5 seconds, every minute, every 10 minutes) monitors items that the user may have selected for purchase to determine if the user has selected an item that is within the budget defined by the scope. If it is determined that a selected item exceeds a defined budget, then a warning may be generated, such as an audible or visual warning via a user device, alerting the user that the location and/or selected item is out of the scope of the shopping trip. Accordingly, alternate solutions may be presented to the user via the user device such as a financing option (e.g., a loan) allowing the customer to pay for the overage amount (e.g., the amount of money that exceeds the budget) over a period of time, options to transfer funds from other identified budgets to the violated budget, alternative items that are cheaper, on sale, associated with a coupon, or otherwise provide an incentive that abides by the budget, etc. If it is determined that the selected item falls abides by the budget, then no warning may be issued by the budget and scope generation and management system. In some embodiments, upon determination that a selected item abides by the budget, various upgrade options, such as an upgrade to a more expensive item that does not exceed the budget and/or lie outside the scope, may be presented to the user.

In various arrangements, the budget and scope generation and management system continuously or intermittently (e.g., every 5 seconds, every minute, every 10 minutes) monitors items that have been previously selected by the user in order to detect if the user has selected (e.g., replaced) a different item for a previously-selected item. In such arrangements, the budget and scope generation and management system recommends further alternate solutions based on the selected different item. The further alternate solutions can include a recommended upgraded item (e.g., a more expensive item) to replace another previously selected item, one or more further items that the user may purchase (e.g., additional items), or recommended cheaper items to replace another previously-selected item. For example, assume a user that is grocery shopping selected a name-brand gallon of milk for purchase. Sometime later, the user replaces the name-brand gallon of milk with an off-brand gallon of milk (e.g., a cheaper item) for purchase. As such, the difference in price between the name-brand gallon of milk and the off-brand gallon of milk reduces the total amount of money that the user is to spend on the particular grocery-shopping trip. Accordingly, the budget and scope generation and management system can recommend, for one or more other previously selected items, an upgraded (e.g., more expensive) item that abides by the difference in price due to the selection of the off-brand gallon of milk in lieu of the name-brand gallon of milk.

In another example, assume a user that is grocery shopping selected an off-brand gallon of milk for purchase. Sometime late, the user replaces the off-brand gallon of milk with a name-brand gallon of milk (e.g., a more expensive item) for purchase. As such, the difference in price between the off-brand gallon of milk and the name-brand gallon of milk exceeds the budget for the particular grocery-shopping trip. Accordingly, the budget and scope generation and management system can recommend, transferring funds to the particular budget from a different budget or, for one or more other previously selected items, a cheaper item that abides by the particular budget.

In various arrangements, the budget and scope generation and management system recommends purchase decisions based on established long-term financial goals of a user. The system can recommend decisions based on budgets (e.g., reducing an amount of funds allocated to a particular budget), individual purchases, etc. Accordingly, the decisions are made relative to long-term financial goals by comparing the funds associated with a budget or individual purchase to funds associated with the long-term financial goals. For example, assume a user who is saving funds to take a vacation currently desires to purchase a new mobile phone. Upon detecting that the user is intending to purchase the new mobile phone (e.g., by selecting the new mobile phone for purchase), the budget and scope generation and management system transmits an alert to the user via a user device presenting a time-estimate of how soon the user can achieve the savings goal of the vacation if the user does not purchase the new mobile phone. In such arrangements, frugal financial decisions (e.g., a decision made to not purchase an item, a decision to reduce funds allocated to a particular budget) may be transmitted to a social media organization via an API.

With retail locations increasingly offering a more diverse selection of items for purchase, the budget and scope generation management system disclosed herein provides a solution allowing users to maintain course on a predetermined shopping trip and keep track of finances while on a shopping trip. Additionally, as will be described in greater detail, the budget and scope generation management system provides users with optimal paths through a retail location, recommended items for purchase, and a finance-monitoring feature allowing for users to venture on an expedited and budget-abiding shopping trip.

Referring now to FIG. 1, a block diagram of a budget and scope generation and management system 100 is shown, according to an example embodiment. As will be described in further detail below, the system 100 facilitates the generation of one or more budgets, a scope associated with each of the budgets, and monitoring of expenditures to determine a relation of the expenditures with the budget and/or scope. As shown, the system 100 includes, among other systems, a provider computing system 102, a user device 104, and a retailer computing system 106. The provider computing system 102 is shown to be communicatively and operatively coupled to user device 104 and retailer computing system 106 over a network 108. The network 108 provides communicable and operative coupling between the provider computing system 102, user device 104, and retailer computing system 106, and other components disclosed and described herein to provide and facilitate the exchange of communications (e.g., data, instructions, messages, values, commands, etc.). Accordingly, the network may include any network include wired (e.g., Ethernet) and/or wireless networks (e.g., 802.11X, ZigBee, Bluetooth, WiFi, etc.). In some arrangements the network 108 includes the Internet. In further embodiments, the network 108 includes a proprietary banking network to provide secure or substantially secure communications.

The provider computing system 102 is operated by a provider, which is an entity that facilitates various types of transactions between the user device 104, retailer computing system 106, and various other entities not explicitly described or shown herein. The provider may a bank, credit union, a payment services company, or other similar entities. The provider computing system 102 includes, among other systems, a network interface circuit 110 enabling the provider computing system 102 to exchange data over network 108 and a processing circuit 112.

The network interface circuit 110 includes program logic that facilitates connection of the provider computing system 102 to the network 108. The network interface circuit 110 supports communication between the provider computing system 102 and other systems, such as the user device 104 and retailer computing system 106. For example, the network interface circuit 110 includes a cellular modem, a Bluetooth transceiver, a Bluetooth beacon, a radio-frequency identification (RFID) transceiver, and a near-field communication (NFC) transmitter. In some embodiments, the network interface circuit 110 communicates via a secure wired connection with a branch of a provider (e.g., a financial institution) associated with the provider computing system 102. In some arrangements, the network interface circuit 110 includes the hardware and machine-readable media sufficient to support communication over multiple channels of data communication. Further, in some arrangements, the network interface circuit 110 includes cryptography capabilities to establish a secure or relatively secure communication session with the provider computing system 102, user device 104, and retailer computing system 106. In the regard, financial data (or other types of data) may be encrypted and transmitted to prevent or substantially prevent the threat of hacking.

The processing circuit 112 includes a processor 114 and memory 116. The processor 114 may be implemented as one or more application specific integrated circuits (ASICs), field programmable gate arrays (FPGAs), a group of processing components, or other suitable electronic processing components. Memory 116 may be one or more devices (e.g., RAM, ROM, Flash memory, hard disk storage) for storing data and/or computer code for completing and/or facilitating the various processes described herein. Memory 116 may be or include non-transient volatile memory, non-volatile memory, and non-transitory computer storage media. Memory 116 may include database components, object code components, script components, or any other type of information structure for supporting the various activities and information structures described herein. Memory 116 may be communicably coupled to the processor 114 and include computer code or instructions for executing one or more processes described herein.

The provider computing system 102 is shown to include a management circuit 118 structured to receive, manage, and monitor various budgets and scope constraints associated with each budget. Accordingly, the provider computing system 102 is communicably and operatively coupled with the user device 104 and/or the retailer computing system 106. In some arrangements, the budgets and scopes associated therewith received by the management circuit 118 are associated with account holders who hold one or more financial accounts (e.g., checking account, savings account, credit account) with the provider of provider computing system 102. As previously described, in various arrangements, a budget defines a maximum amount of funds a user wishes to spend over a period of time. In other words, a budget is an allocation of money to certain expenditures (e.g., food, clothing, rent/mortgage, leisure). In this regard, a scope defines a scope merchant category of the certain expenditures associated with a particular budget. For example, a user identifies that he/she wishes to allocate $400 per month to a clothing budget indicating that he/she is allocating $400 on clothing items over the course of a month.

In various arrangements in which the management circuit 118 receives a budget associated with an account holder of an account with the provider, the management circuit 118 communicates with account linkage circuit 122 to retrieve one or more financial accounts associated with the account holder and correlates each budget and/or scope associated therewith to a financial account the user holds with the provider of provider computing system 102. Accordingly, the management circuit 118 is communicably and operatively coupled to the account linkage circuit 122 and the account database 124. In such arrangements, the management circuit 118 is structured to cross-check with a financial account (e.g., average monthly income, current amount of funds in account) to determine if one or more budgets will cause for the financial account to overdraft (e.g., withdraw a greater amount of funds than available in account). For example, a user identifies that he/she wishes to spend $1,000 on food per month. However, based on the financial account associated with the user, the user has $200 in savings with a monthly income of $500. As such, over the month, the user accumulates a maximum amount of funds of $700, which is less than the identified food budget of $1000. In such cases, the management circuit 118 indicates that the user does not have enough funds for such a budget.

In various arrangements, the management circuit 118 is configured to determine remaining funds for each budget. The management circuit 118 is communicably and operatively coupled to the retailer computing system 106 to retrieve customer information (e.g., transaction information, items purchase, number of trips to a retailer location). In some arrangements, the management circuit 118 is configured to receive signals from the user device 104 and/or retailer computing system 106 indicating that a user has purchased one or more items. The management circuit 118 is structured to correlate the one or more items with one or more budgets established by the user and update the one or more budgets based on the expenditures of the one or more items. For example, a user purchases, from a retailer associated with the retailer computing system 106, a gallon of milk and a shirt. As such, the management circuit 118 receives the transaction signal indicating the purchase of the gallon of milk and the shirt and subtracts the cost of the gallon of milk from a budget associated with a "food" scope and subtracts the cost of the shirt from a budget associated with a "clothing" scope.

Alternatively, in various arrangements, the management circuit 118 is structured to generate time-based budgets and/or scopes that relate to future events (e.g., a future shopping trip, a future payday, a future birthday gift). For example, a user may identify one or more items that he or she wishes to purchase at a later time (e.g., on a future shopping trip, after a payday). Accordingly, the management circuit 118 automatically generates a budget and/or scope related to this item based on a time constraint (e.g., the day on which the future shopping trip occurs, the day of payday). In another example, the management circuit 118 generates such a time-based budget and/or scope according to a purchase price. Such a purchase price may correlate to a sale price (notifying the user to purchase when the item is detected to be on sale) or a savings plan (notifying the user to purchase when the user has saved an amount of money correlating to the purchase price).

In various arrangements, the management circuit 118 is capable of generating shopping trends from the retrieved customer information to determine and/or predict when the funds allocated to a certain scope will be used up. For example, a customer that allocates $600 to a food scope per month travels to a grocery store every week and spends an average of $200 per trip. Based on the average expenditures of the shopping trip and average number of trips, the management circuit 118 determines that beyond three trips to the grocery store will put the customer's budget out of range. In various arrangements, the shopping trends are used to determine anomalous shopping activities. For example, assume a user does not own or lease an automobile, but the user purchases tires for an automobile. Accordingly, the tire purchase may be identified as an anomalous shopping activity, and a notification is transmitted to the user indicating the anomalous shopping activity. In various arrangements, anomalous shopping activities are determined based on a comparison of a user's shopping trends and a pool of shoppers with similar shopping trends. Such a comparison may further the enablement of anomalous shopping activities detection by using a larger pool of shopping trend data (e.g., comprising the shopping of shoppers with similar shopping trends) rather than an individual user's shopping data.

In some arrangements, the management circuit 118 receives a budget and/or a scope associated therewith relating to a planned shopping trip. As will be described in greater detail below, example information included in the budget and scope indicates one or more specific items that a user has identified for purchase, a scope merchant category of items that the user is planning to purchase, and/or an amount of money that the user plans to spend. In such arrangements, the management circuit 118 links the budget to the financial account of the user to determine if the budget abides by the financial information of the account. Further, the management circuit 118 transmits notifications and/or provides solutions to the user in cases which the user strays from the budget. For example, a user who has identified he/she wishes to purchase an item that is $250 over a specific budget is offered a loan to finance the overage amount of $250. In another example, a user who has identified he/she wishes to purchase an item that is $250 over a specific budget is offered options to transfer funds allocated to one or more different budgets.

The provider computing system 102 is also shown to include an account linkage circuit 122 structured to link a financial account that a user holds with the provider of provider computing system 102 with the information (e.g., budget, scope, shopping information) received by management circuit 118. Accordingly, the account linkage circuit 122 is communicably and operatively coupled to the management circuit 118. For example, the account linkage circuit 122 receives a budget associated with a user and links the budget information (e.g., funds allocated, scope associated with budget) to the financial account associated with the user. In this regard, the account linkage circuit 122 is communicably and operatively coupled to the account database 124 to retrieve the account information for a user.

In various arrangements, the account linkage circuit 122 is structured to link a financial account of a user with the retailer computing system 106. As such, the account linkage circuit 122 is communicably and/or operatively coupled to the retailer computing system 106 and/or the merchant application circuit 136 associated with the user device 105. For example, a patron of the retailer associated with retailer computing system 106 purchases an item from the retailer by inputting account information to the retailer computing system 106. As such, the account linkage circuit 122 receives the account information from the retailer computing system 106 and retrieves the account from the account database 124 for use by the retailer computing system 106 to withdraw funds to sell the item to the patron.

The provider computing system 102 is shown to include an account database 124 structured to store accounts associated with account holders of the provider of provider computing system 102. An example account includes a checking account, a savings account, a credit account, an investment account, a retirement account, a brokerage account, a mortgage account, a rewards account, and the like. Such accounts may include information indicating account balances, account activities, profile information (e.g., contact information of user), ATM transaction history, etc. As previously described, the account database 124 is communicably and operatively coupled to the account linkage circuit 122. The account database 124 is structured to store any type of information (e.g., savings amount, average income, contact information) relating to account holders associated with the provider of provider computing system 102. In various arrangements, the account database 124 is communicably and operatively coupled to the management circuit 118 (e.g., via account linkage circuit 122) and is structured to store budget and/or scope information associated with an account holder.

The system is also shown to include a user device 104, which is a computing device associated with a user. The user device 104 includes any type of computing device that may be used to conduct financial transactions and/or receive information from the provider computing system 102 or the retailer computing system 106. In some arrangements, the user uses the user device 104 to both communicate information to the retailer computing system 106 over the network 108 as well as communicate information with the provider computing system 102. In this regard, the user device 104 may include any wearable or non-wearable device. Wearable devices refer to any type of device that an individual wears including, but not limited to, a watch (e.g., a smart watch), glasses (e.g., eye glasses, sunglasses, smart glasses), bracelet (e.g., a smart bracelet), etc. The user device may also include any type of mobile device including, but not limited to, a phone (e.g., smart phone), table, personal digital assistant, and/or computing devices (e.g., desktop computer, laptop computer, personal digital assistant). In some arrangements, the user associated with the user device 104 is an account holder of at least one account managed by the provider (associated with provider computing system 102). In such arrangements, the account information held by the user is stored in the account database 124.

In various arrangements, the user device 104 is a computing device provided by a retailer associated with retailer computing system 106. In such arrangements, the user device 104 is a device that a patron of the retailer checks out upon arrival at the retailer. In some arrangements, the user device 104 is a shopping cart including a screen and various sensors that collect data such as identification (e.g., product number, scope, price) of items placed into the cart, location of the cart within a retailer building, etc. Accordingly, the user device 104 is communicably and operatively coupled with the retailer computing system 106.

In the example embodiment of FIG. 1, the user device 104 includes a network interface circuit 126 enabling the user device 104 to exchange information over the network 108, a processing circuit 128, a location position sensor 138, and an input device 140. The processing circuit 128 is shown to include a processor 130 and memory 132 including a client application circuit 134 and a merchant application circuit 136. The processing circuit 128, processor 130, and memory 132 may be the same or similar as the processing circuit 112, processor 114, and memory 116 respectively described with reference to the provider computing system 102.

The network interface circuit 126 of the user device 104 is adapted for and configured to establish a communication session via the network 108 between the user device 104 and other systems, such as the provider computing system 102 and the retailer computing system 106. Accordingly, the network interface circuit 126 includes any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), or a combination thereof (e.g., both a cellular transceiver and a Bluetooth transceiver). In some embodiments, the network interface circuit 126 communicates via a secured wired connection within a branch of the provider associated with the provider computing system 102. The network interface circuit 126 may be the same or similar as the network interface circuit 110 previously described with reference to the provider computing system 102.

The client application circuit 134 included in the user device 104 is structured to provide displays to the user device 104 that enable the user to manage provider accounts. The client application circuit 134 is also structured to facilitate the creation of budgets and scopes associated therewith and link the created budgets and/or scopes with a financial account the user holds with the provider. Accordingly, the client application circuit 134 is communicably and operatively coupled to the provider computing system 102. In some embodiments, the client application circuit 134 may be incorporated with an existing application in use by the provider (e.g., a mobile banking application or a mobile wallet application). In other embodiments, the client application circuit 134 may be downloaded by the user device 104 prior to its usage, hard-coded into the memory 132 of the user device 104, or be a web-based interface application, which may be executed remotely from the user device 104. In the latter instance, the user may have to log onto or access the web-based interface before usage of the application. Further, and in this regard, the client application circuit 134 may be supported by a separate computing system including one or more servers, processors, network interface circuits, etc. that transmit applications for use to the user device 104. In certain embodiments, the client application circuit 134 includes an API and/or a software development kit (SDK) that facilitate the integration of other applications with the client application circuit 134.

In various arrangements, the client application circuit 134 is structured to transmit budget and scope information to the provider computing system 102. In some arrangements, the client application circuit 134 is structured to receive a budget and scope information from the merchant application circuit 136. In this regard, such budget and scope information indicates a planned shopping trip to a retailer location and includes one or more specific items the user desires to purchase from the retailer associated with the retailer computing system 106, a scope merchant category of items desired for purchase by the user, a map of a retailer location based on identified items, and a maximum amount of money the user wishes to spend. Accordingly, the client application circuit 134 is communicably and operatively coupled to the provider computing system 102, retailer computing system 106, and the merchant application circuit 136. In such arrangements, the client application circuit 134 allows an account holder to establish budgets and scopes for the budget and link the budget and/or scope with the financial account of the account holder. The client application circuit 134 is also be configured to manage joint holder accounts (e.g., accounts that are held by more than one user) in accordance with the various budgets and/or scope identified by the joint holders of the account.

User device 104 is shown to further include a merchant application circuit 136 structured to allow a user to input budget and scope information to plan a shopping trip associated with the retailer of the retailer computing system 106. Accordingly, the merchant application circuit 136 is communicably and operatively coupled with the retailer computing system 106. For example, the merchant application circuit 136 allows a user to select one or more items that he/she wishes to purchase from the retailer and identify an estimated cost to purchase the items. As previously described, a budget defines a maximum amount of money (as can be identified by a user) that the user is permitted or wishes to spend on one or more items. The types of budgets (e.g., food budget, clothing budget, leisure budget) and scopes (food items, clothing items, leisure activities) presented to the user via the merchant application circuit 136 are dependent upon and configurable to the type of retailer associated with the retailer computing system 106. For example, a user may identify via the merchant application circuit 136 that he/she is allocating a maximum expenditure of $2.00 on a gallon of milk. As such, the merchant application circuit 136 generates a budget of $2.00 for a dairy scope. In some arrangements, the merchant application circuit 136 is structured to receive financial account information from the user associated with the user device 104

In various arrangements, the merchant application circuit 136 includes further features such as optimization of a route through a retailer building based on a budget, scope, and/or list of items identified by the user. For example, upon identification of one or more items identified by the user, the merchant application circuit 136 determines, based on location of the one or more items identified by the user within the retailer building, an optimal route (e.g., a shortest route based on distance traveled to each item) through the retailer building for the user to pursue the identified items. Further, in some such arrangements, the merchant application circuit 136 can determine a route that substantially avoids the user of the user device 104 to travel through various locations of the retailer building that contain items outside of the scope identified by the user. In some embodiments, the merchant application circuit 136 is also be configured to optimize the cost of a budget identified by the user. For example, a user that selects a loaf of bread costing $2.00, but the merchant application circuit 136 may detect that a cheaper alternative to the selected loaf of bread is available for purchase by the user (e.g., an alternative loaf of bread costing $1.50).

The user device 104 is also shown to include a location position sensor 138. The location position sensor 138 is structured to receive location data and determine a location or receive information indicative of a location of the user device 104. In one embodiment, the location position sensor 138 includes a global position system (GPS) or any other type of location positioning system. As such, the location position sensor 138 receives latitude data, longitude data, and other types of location or position data to determine the location of the user device 104. In other embodiments, the location position sensor 138 receives an explicit location identification from the user of the user device 104. All such variations are intended to fall within the spirit and scope of the present disclosure.

In various arrangements, the location data received by the location position sensor 138 is used to determine a location of the user device 104 within a retailer location (e.g., a store building). Accordingly, the location position sensor 138 is communicably and operatively coupled to the client application circuit 134 and merchant application circuit 136 to provide the client application circuit 134 and the merchant application circuit 136 with location information of the user device 104.

The user device 104 is also shown to include an input device 140 structure to facilitate a user interaction with the user device 104. The input device 140 can be any piece of hardware such as a touchscreen, a keyboard, a mouse, a credit card, a payment terminal capable of allowing a user to input information to the client application circuit 134 and/or merchant application circuit 136. Accordingly, the input device 140 is communicably and operatively coupled to the client application circuit 134 and merchant application circuit 136. In various arrangements in which the user device 104 is structured as a device provided by the retailer associated with the retailer computing system 106 (such as a smart shopping cart), the input device 140 includes a payment terminal with which a user can swipe a payment card (e.g., a credit card, a gift card, a debit card) or insert cash to pay for items purchased from the retailer.

In some arrangements, the input device 140 includes a scanning device (e.g., a barcode scanner) structured to scan a product identification code (e.g., a barcode, a QR code, etc.) and transmits to product identification code to the merchant application circuit 136 for decoding of the information (e.g., item number, cost) associated with the product identification code. In some arrangements, the input device 140 includes one or more NFC transceiver devices configured to determine one or more items selected by the user. For example, user device 104 structured as a shopping cart includes one or more NFC transceivers (e.g., input device 140) disposed within the basket in which a customer places items. Upon placement of an item in the basket, the input device 140 senses the item and transmits the signals to the merchant application circuit 136.

Still referring to FIG. 1, the retailer computing system 106 is shown to include a network interface circuit 142 enabling the retailer computing system 106 to exchange information over the network 108 and a processing circuit 144. The processing circuit 144 is shown to include a processor 146 and memory 148 including a client application circuit 150 and a merchant database 154. The processing circuit 144, processor 146, and memory 148 may be the same or similar as the processing circuit 112, processor 114, and memory 116 respectively described with reference to the provider computing system 102.

The retailer computing system 106 is operated by a retailer, which is an entity that facilitates various types of transactions for goods and/or services provided by the retailer between a customer and the retailer. In various arrangements, the retailer is a store, grocery store, market, hardware store, clothing store, electronics store, book store, a pharmacy, a convenience store, a gas station, or other similar entities. In some embodiments, the retailer is a restaurant, a café, a bar, food truck, bistro, diner, cafeteria, or other similar entities.

The retailer computing system 106 includes any computing system structured to manage various functions associated with a retailer such as customer transaction information, product inventory management, and financial bookkeeping. Further, the retailer computing system 106 includes any type of computing device that may be used to conduct financial transactions and/or receive information from the provider computing system 102 and/or the user device 104. In some arrangements, the retailer computing system 106 may be a point-of-sale (POS) terminal (e.g., a checkout computing system, a self-service checking computing system, a drive-through terminal) structured to facilitate a transaction for goods sold by the retailer associated with the retailer computing system 106.

Retailer computing system 106 is shown to include a client application circuit 150 structured to facilitate connectivity of the retailer computing system 106 with the provider computing system 102. Accordingly, the client application circuit 150 is communicably and operatively coupled to the provider computing system 102 and/or the user device 104. In certain embodiments, the client application circuit 150 includes an API and/or a software development kit (SDK) that facilitate the integration of other applications with the client application circuit 150. In various arrangements, the client application circuit 150 receives financial account information from a customer of the retailer who holds a financial account with the provider of provider computing system 102. As such, the client application circuit 150 is configured to communicate with the provider computing system 102 to correlate various budgets and scopes associated with each budget. It should be understood that the various budgets and scopes include both budgets and scopes a user can create via the client application circuit 134 based on his/her financial account information and a shopping trip budget and scope a user can create via the merchant application circuit based on a shopping trip to a retailer location, both of which are previously described.

Retailer computing system 106 is shown to include a merchant management circuit 152 structured to facilitate the purchase of items by patrons of the retailer associated with the retailer computing system 106. In addition, the merchant management circuit 152 is configured to manage and monitor a shopping budget and scope associated therewith. Accordingly, the merchant management circuit 152 is communicably and operatively coupled with the user device 104. In various arrangements, the merchant management circuit 152 is structured to receive financial account information and/or budgets that a customer of the retailer created with the provider of provider computing system 102. As such, the merchant management circuit 152 is communicably and operatively coupled with the provider computing system 102.

In both regards, the merchant management circuit 152 is structured to retrieve various retailer information such as product numbers, product cost, store map, item location, and the like. Accordingly, the merchant management circuit 152 is communicably and operatively coupled to the merchant database 154. The merchant management circuit 152 is structured to use the retrieve information from the merchant database 154 to generate an optimal route through a retailer (the optimal route defining an acceptable region of the retailer location for the user of user device 104 to travel) and correlate desired items for purchase by the customer with a generated scope and/or budget.

Retailer computing system 106 is also shown to include a merchant database 154 structured to store various merchant information and data associated with the retailer of retailer computing system 106. Such merchant information and data can include merchant category code (MCC) of the retailer, purchasable item numbers and cost, store layouts, and the like. Accordingly, the merchant database is communicably and operatively coupled to the merchant management circuit 152.

Figure 2:
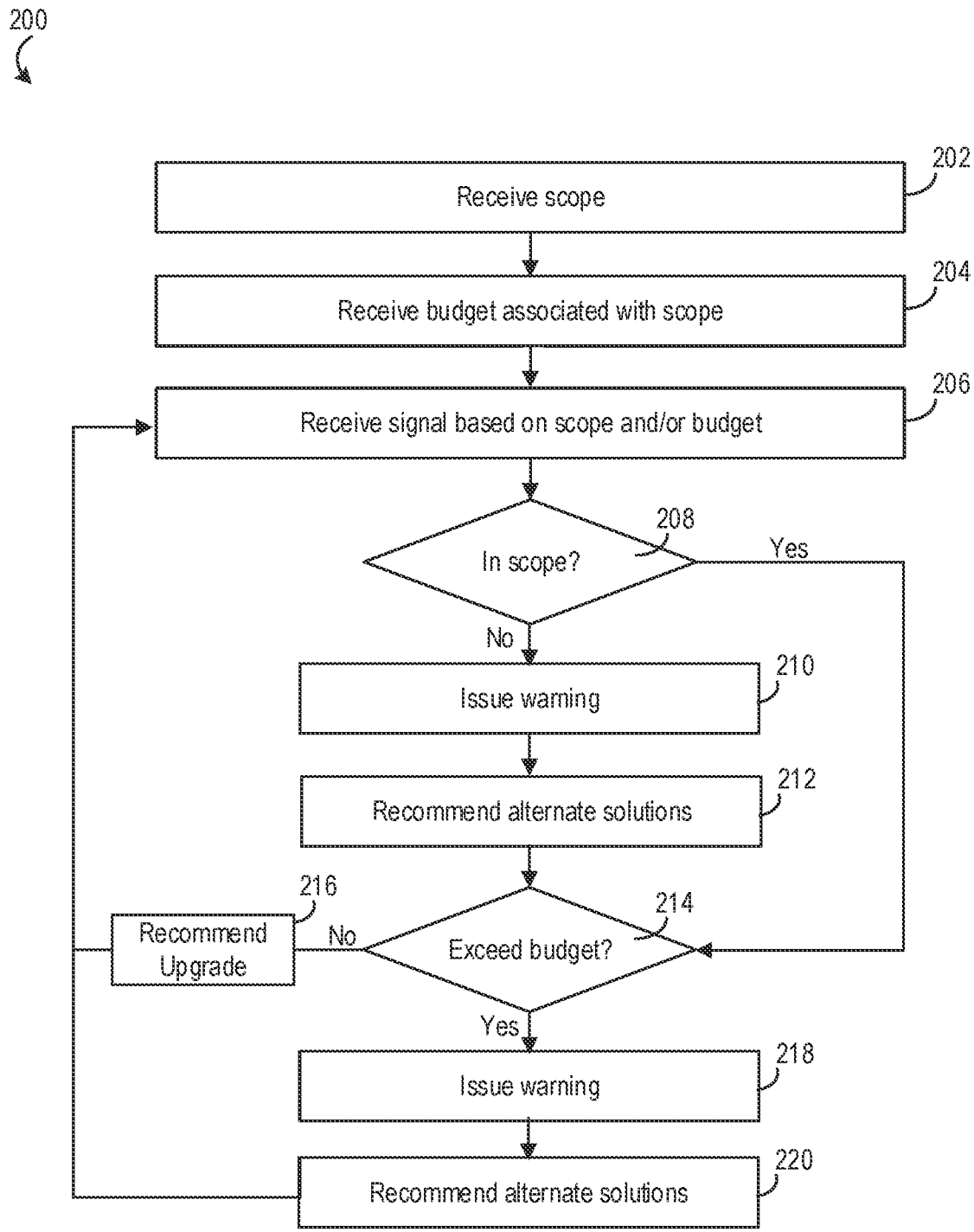
FIG. 2 is a flowchart depicting a method for generating and managing scopes associated with a retail setting, according to an example embodiment.

Referring now to FIG. 2, a flowchart of a method 200 of generating a budget and scope associated therewith and managing the budget and scope is shown, according to an example embodiment. In various embodiments, the method 200 is performed by the components of system 100 shown in FIG. 1 such that reference may be made to components of FIG. 1 to aid the description of method 200. In some arrangements, through the method 200, the provider computing system 102 and/or retailer computing system 106 receives a budget and a scope associated therewith, monitors various financial transactions and/or actions of a user, and issues alerts and/or recommendations to the user based on the budget, scope, financial transactions, and/or actions of the user. In various arrangements, the method 200 is performed by the provider computing system 102. In other arrangements, the method 200 is performed by the provider computing system 102 in communication with the retailer computing system 106.

An exemplary implementation of the method 200 is a retail setting including a retailer that provides goods and/or services to customers. A customer sets a budget for a shopping trip and identifies a scope (e.g., scope merchant category of items) of items to purchase. Based on the budget, identified items, and/or scope, the customer's actions are monitored throughout the shopping experience to determine if the customer has violated the budget and/or scope. In the cases in which the customer violates the budget and/or scope, the customer is offered recommendations to correct the violation. In other cases in which the customer does not violate the budget and/or scope while shopping, the customer is presented with various upgrade options that are an improvement over a previous item but do not exceed the budget and/or scope of the shopping trip. The scenario of the retail setting will be described in greater detail with relation to each step in the method 200.

A scope is received at step 202. In various embodiments, the scope is received by the retailer computing system 106 and/or the provider computing system 102 from the user device 104. In some embodiments, the scope received includes information such as one or more items that the customer wishes to purchase from a retailer. For example, the scope received can include a list of one or more specific items. In addition, or alternatively, the scope includes information such as one or more scope merchant categories of items for items offered for sale by the retailer. For example, in scenarios which the customer is not certain of specific items that he/she desires to purchase, the customer selects a scope merchant category of items such as toiletries, food, clothing, and electronics. Further, in various embodiments, the received scope includes retailer location information such as locations of the items or category of items within the retailer location which define an acceptable region within the retailer location that the customer can visit. Various examples by which acceptable regions can be defined include specific aisles in which the items or category of items are located, general location within the store (e.g., front side of store, back side of store, right side of store, left side of store), and/or department locations within the store (e.g., produce department, electronics department, outdoor department). For example, an acceptable region for a scope including cereal may be the cereal aisle in which the cereal is located. In another example, an acceptable region for a grill may be the location of the outdoors department. More specifically, the scope defines an optimal route through a retailer location which a customer takes to purchase one or more items identified by the scope.

A budget associated with a scope is received at step 204. In various embodiments, the budget is received by the retailer computing system 106 and/or the provider computing system 102 from the user device 104. The budget received at step 204 includes various information such as an amount of funds allocated to the scope and an identification of the user who generated the budget. In some such embodiments, the budget is linked to a shopping account that includes various customer information (e.g., previous purchases, contact information, rewards information, payment information). Alternatively, or in addition to, the provider computing system 102 links the received budget to one or more financial accounts associated with the user who set up the budget. In various embodiments, the budget is received as part of the scope identifying one or more specific items that the customer desires to purchase such that the budget is a summation of the cost of the one or more specific items.

A signal based on the scope and/or budget is received in step 206. In general, the signal received at step 206 includes shopping information (e.g., selection of an item, location of the user device 104 within a retailer location). In some arrangements, the signal is transmitted from the user device 104 to the retailer computing system 106 and/or provider computing system 102. In such arrangements, the signal received is collected from a scanning device that has scanned an item selected by the user. In other arrangements, the signal received is collected from various sensors located on or within the user device 104 such as a shopping cart with one or NFC transceivers dispose within the basket. In some arrangements, the signal received includes information of an item that a user has selected. In this regard, information about the item such as product number, name, and price can be received as a part of the signal.

In some arrangements, the signal received at step 206 includes location information. In this regard, the signal can include information such as a position of the user device 104 within a retailer location. Further, and in this regard, the location information is continuously received. In some embodiments, the signal received at step 206 indicates that the user has traveled down a hallway in the retailer location that includes items that are not within the budget and/or scope. For example, the signal received indicates that a customer who has identified a budget of $2.00 to purchase a gallon of milk in the scope of food items is located in a hallway providing televisions for purchase. In some embodiments, the signal received at step 206 indicates that the user device 104 is located outside of an acceptable region defined by the scope. As previously described, in some arrangements, the acceptable region is based on a relative location of the one or more items identified in the scope. In other arrangements, the predetermined region is based on a predetermined path defining a recommended route that the user should take to retrieve the desired items. As such, a signal is transmitted indicating that the user has strayed from the identified acceptable path.

A scope decision is presented at step 208 representing a decision whether the signal received is within the received scope. More specifically, step 208 involves interpreting the signal including product information and/or location information to determine if one or more items and/or location (e.g., location of the user device 104) are within the received scope. If, at step 208, it is determined that signal is out of scope, then the method 200 continues with issuing a warning at step 210. In some embodiments, the warning issued at step 210 is generated and transmitted to a user device (e.g., user device 104) for presentation of the warning to a user. The issued warning may include any combination of a visual warning generated by a user device (e.g., a message displayed on user device 104, illumination of a light source provided by user device 104), an auditory warning (e.g., a recorded warning, a warning tone, a warning chime) generated by a user device, and/or vibration of a user device. The information generated as part of the warning is dependent upon the information received as part of the signal. In some embodiments, if the signal received includes one or more items that are out of the scope, then the warning displays information relating to the one or more items being out of scope. For example, a customer who has selected a television for purchase but selected a toiletry scope is presented with a warning that the television is outside the scope of toiletries. In other embodiments, if the signal received includes location information indicating the user device 104 is out of a predetermined location, then the warning displays information relating to location. For example, a customer who is located in the electronics department but selected a toiletry scope for the particular shopping trip is presented with a warning that the location of the electronics department is not part of the location defined by the toiletry scope.

Alternate solutions are recommended at step 212. In various arrangements, the alternate solutions provide options for the user to add an additional scope to the shopping trip. For example, a customer who has selected a television for purchase but selected a toiletry scope is presented with an option to add an electronics scope to the shopping trip. Accordingly, an adjusted budget or other financial information relating to the purchase of an item in an added scope are linked with the additional scope. In other arrangements, the alternate solutions provide maps of the retailer location prompting the acceptable region within the retailer location and an optimal route (e.g., shortest distance) that the customer can take to return to the acceptable region. If, at step 208, it is determined that the signal is within the scope, then the method 200 continues directly to step 214 (e.g., a warning is not issued as described with reference to step 210 and no alternate solutions are recommended as described with reference to step 212).

A budget decision is presented at step 214 representing a decision whether the signal received is within the received budget. More specifically, step 214 involves determining whether the cost of one or more items identified in the signal exceed the budget. If, at step 214, it is determined that the signal is within the budget, then the method 200 continues with an upgrade recommendation at step 216. In various arrangements, step 216 involves recommending an upgrade to a more expensive item that does not exceed the budget and/or lie outside the scope. For example, if the signal received indicates an off-brand item (an item that typically costs less than a brand-name item), then an upgrade to a name-brand item is recommended if the name-brand item is still within the scope of the shopping trip and does not exceed the budget. In another example, if the signal received indicates a smaller-sized item such as a 55-inch television, then an upgrade to a larger item such as a 60-inch television is recommended if the 60-inch television does not exceed the budget.

If, at step 212, it is determined that the signal exceeds the budget, then the method 200 continues with issuing a warning at step 218. In some embodiments, the warning issued at step 218 is generated and transmitted to a user device (e.g., user device 104) for presentation of the warning to a user. The issued warning may include any combination of a visual warning generated by a user device (e.g., a message displayed on user device 104, illumination of a light on user device 104), an auditory warning (e.g., a recorded warning, a warning tone, a warning chime) generated by a user device, and/or vibration of a user device. The information generated as part of the warning is dependent upon the information received as part of the signal. In various arrangements, the warning provides the user with information such as an amount of money by which the selected item exceeds the budget and the acceptable amount of expenditures defined by the budget.

Alternate solutions are provided to the user at step 220. In general, the alternate solutions provide options for the customer to pursue in order to remedy the budgetary violation. In various arrangements, the alternate solutions provided include a financing option (e.g., a loan) allowing the customer to pay for the overage amount (e.g., the amount of money that exceeds the budget) over a period of time. In such arrangements, the loan terms (e.g., payment period, interest rate, cosigner requirements) and minimum overage amount (e.g., the minimum overage amount required for a loan to be offered) are configurable based on retailer and/or provider preferences and credit worthiness of the customer. In various arrangements, the alternate solutions include options to transfer funds from other identified budgets to the violated budget. In some arrangements, the alternate solutions include alternative items that are cheaper, on sale, associated with a coupon, or otherwise provide an incentive that abides by the budget.

Figures 3, 4:
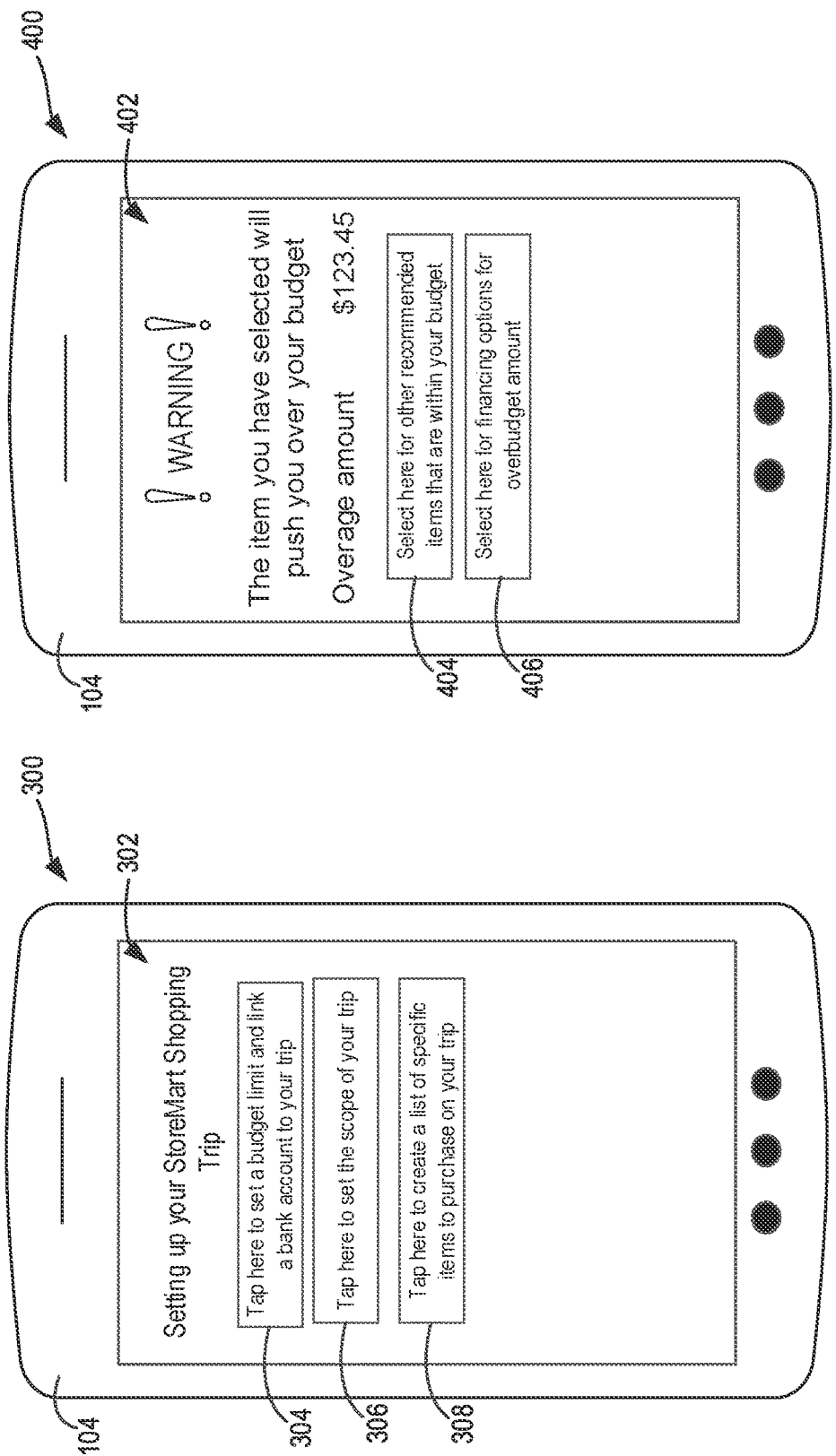
FIG. 3 is a schematic drawing depicting an example user interface of the user device used in the system of FIG. 1 for generating a budget and scope for a shopping trip, according to an example embodiment.
FIG. 4 is a schematic drawing depicting an example user interface of the user device in the system of FIG. 1 for violating a budget, according to an example embodiment.

Referring now to FIG. 3, an example user interface 300 of the user device 104 (shown as a smartphone) presenting a budget generation interface is shown, according to an example embodiment. The user interface 300 presents a planning interface 302. The planning interface 302 is an example of an interface generated when a customer wishes to plan a shopping trip. In various arrangements, the example user interface 300 and planning interface 302 are generated via the merchant application circuit 136. In some embodiments, the example user interface 300 and planning interface 302 are generated via the client application circuit 134.

The planning interface 302 presents the user with a bank account link selection option 304, a scope selection option 306, an items selection option 308, according to an example embodiment. Upon selection of the bank account link selection option 304, the user is prompted to enter bank account information (e.g., account number, financial institution routing number, PIN). In certain embodiments in which the planning interface 302 is generated via the client application circuit 134, the bank account can be automatically linked with the shopping trip such that the user is not presented with selection option 304. In various arrangements, the financial information retrieved by linking a bank account through selection option 304 influences the options provided to the user upon selection of the scope selection option 306 and items selection option 308. For example, a user whose bank account is less than $100 is not presented with a scope option in the scope selection option 306 of "laptops" due to laptops typically costing greater than $100. In further arrangements, upon linking the bank account, other previously-generated budgets or scopes can influence the scope and items provided in 306 and 308. For example, if a user typically purchases a bag of coffee during each visit to the retailer, then the user is automatically provided with the option to select the bag of coffee.

Upon selection of the scope selection option 306, the user is prompted to identify one or more scopes (e.g., a scope merchant category of the particular shopping trip). The scopes provided for selection by the user depend on the particular type of retailer (e.g., a convenience store, a grocery store, an electronics store). For example, an electronics store can offer scope selections such as movies, music, video games, televisions, and computers whereas a grocery store can offer scope selections such as fruit, vegetables, meat, frozen, and sweets. In various arrangements, the user is automatically provided with recommended scopes based on previous shopping trends. For example, as previously described, if a user typically purchases a bag of coffee during each visit to the retailer, then the user is automatically provided with the option to select a grocery scope. It should be understood that in any arrangements, the user is provided with a complete list of scopes to select based on the retailer.

Upon selection of the items option 308, the user may be prompted to identify one or more specific items to purchase at the retailer. In various arrangements, the items for selection in items option 406 depend on the selection of one or more scopes with the scope option 404. For example, if a user selects a grocery scope, then the items provided for selection by the user include items considered under the grocery scope. Further, the items provided to the user for selection include recommended items based on previous shopping trends. In one arrangement, items are recommended based on information such as known expiration date and depletion of the item through use of the item by the user. For example, a user purchased a gallon a milk on a previous shopping trip with an expiration date of Apr. 23, 2019. In this regard, a user is planning a shopping trip on Apr. 22, 2019 and based on the known expiration date of the previously-purchased gallon of milk, a new gallon of milk is recommended to the user for selection.

Referring now to FIG. 4, an example user interface 400 of the user device 104 (shown as a smartphone) presenting a budget warning 402 is shown, according to an example embodiment. The budget warning 402 is an example of an interface generated when a customer violates a created budget. In various arrangements, the example user interface 400 and budget warning 402 are generated via the merchant application circuit 136. In some embodiments, the example user interface 400 and budget warning 402 are generated via the client application circuit 134. As shown by the budget warning 402, the selected item exceeds the budget by $123.45. This scenario is intended solely for exemplary purposes to aid the description of the budget warning 402.

The budget warning 402 presents the user with an alternate item selection option 404 and a financing selection option 406 both of which provide solutions to the user to remedy the budgetary violation. Upon selection of the alternate item selection option 404, the user is presented with at least one alternate item to purchase with a cost that abides by the budget indicated by the user. For example, an item that is at least $123.45 cheaper than the item indicated by the budget warning 402 is recommended upon selection of the alternate item selection option 404. In some arrangements, the user is presented with further options such as coupons that put the item within the budget. In another embodiment, the user is presented with the option to transfer funds from another budget or scope.

Upon selection of the finance selection option 406, the user is presented with at least one financing option allowing the user to pay for the overage amount over a period of time. An example of a financing options includes a loan or payment by a credit card. It should be understood that the conditions (e.g., the amount of money finances, loan interest rate, loan period) are configurable based on retailer and/or provider conditions and credit worthiness of the particular user.

Referring now to FIG. 5, an example user interface 500 of the user device 104 (shown as a smartphone) is shown, according to an example embodiment. The user interface 500 includes a scope warning 502 presented to the user. The user scope warning 502 is an example of an interface generated when a user selects an item outside of a pre-identified scope. The scope warning 502 is shown to include a warning description indicating that the item selected by the user is outside the scope. The user interface 500 generates the scope warning 502 including the warning detection upon detecting (e.g., by scanning an item, by placing in a cart with various product sensors) that a particular item is not within the scope. For example, upon selecting a scope of toiletries, a customer selects a television and follows the proper steps of indicating that he/she desires to purchase the television (e.g., scan a barcode, place in a shopping cart). As such, a scope warning is presented to the user based on selection of the television.

The scope warning 502 is also shown to include an item identification presenting information of one or more items that are out of the scope. The item identification indicates that the selected item is a 4K television. The item identification is determined based on scanning of the barcode located on a package of the item and/or placing the item in a shopping cart with sensors configured to identify product information of one or more products in the cart. The scope warning 502 is also shown to include a reminder to the user of the scope of the particular shopping trip. The scope identification indicates that the scope of the particular shopping trip is toiletries (e.g., the customer indicated that he/she is shopping for items such as sanitary paper, toothpaste, soap, tissues).

The user interface 500 also presents a scope update selection option 504. Upon selection of the scope update selection option 504, the user is presented with various options to update the shopping trip scope based on the selected item. In some embodiments, the user is presented with a single scope option based on the item that is identified to be out of the scope. For example, with the reference to item identification provided by the scope warning 502, the user is presented with a scope update option of adding "electronics" to the shopping trip. Accordingly, the update scope selection 504 also retrieves budget information (as described with reference to FIG. 4) to determine whether the television of the item identification is within budgetary constraints of the shopping trip.

The user interface 500 also presents a delete item selection option 506. In various embodiments, upon receiving the information presented by the scope warning 502, the customer decides to abide by his/her scope constraints. As such, the customer selects the delete item selection option which removes the item from a list of desired items for purchase by the customer.

Referring now to FIG. 6, an example user interface 600 of the user device 104 (shown as a smartphone) is shown, according to an example embodiment. The user interface6500 includes a location warning 602 presented to the user. The user interface 600 is an example of an interface generated when a user has stepped outside an acceptable region associated with the scope of the shopping trip. For example, the user associated with the user device 104 is located in the electronics department but selected toiletries as the scope of the shopping trip. The location warning 602 is shown to include a warning description indicating that the user is not located in an acceptable region associated with the scope of the shopping trip. Further, the warning prompts the user to return to the acceptable region.

The user interface 600 presents a map selection option 606. Upon selection of the map selection option 606, the user is presented with a map (e.g., a store layout) of the retailer location. In various embodiments, the map presents a highlighted portion of the map defining the acceptable regions based on the scope of the shopping trip. In some embodiments, the map automatically generates a path defining an optimal route for the user to take in order to return to the acceptable region determined based on the path.

The user interface 600 also presents a scope update selection option 606. Upon selection of the scope update selection option 606, the user is presented with various options to update the shopping trip scope based on location of the user device 104. In some embodiments, the user is presented with a single scope option based on the item location of the user device 104. For example, with the reference to location warning 602, the user is presented with a scope update option of adding an "electronics" scope to the shopping trip. Accordingly, the update scope selection option 606 also retrieves budget information (as described with reference to FIG. 4) to determine whether the updated scope is within budgetary constraints of the shopping trip.

Figure 7:
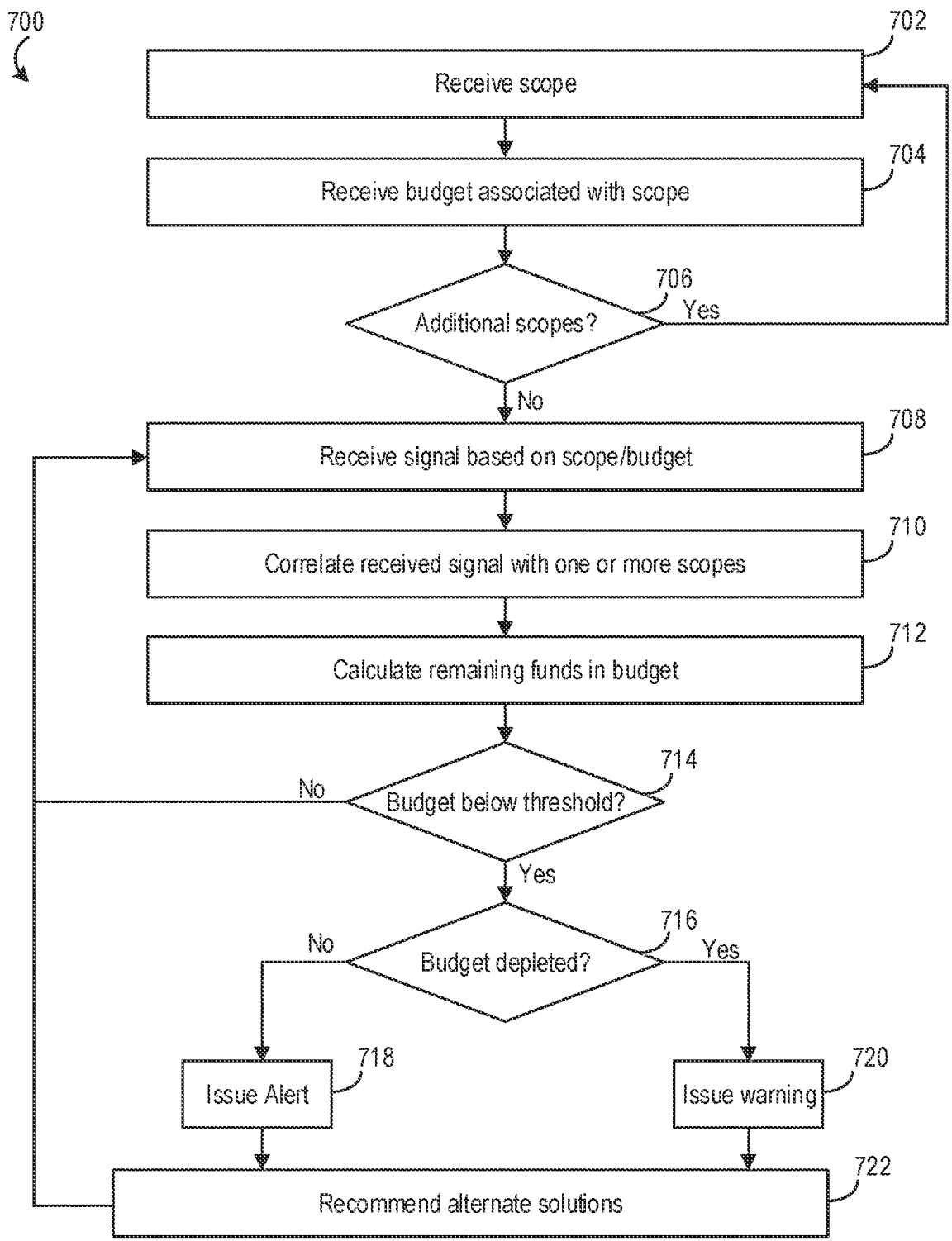
FIG. 7 is a flowchart depicting a method for generating and managing budgets associated with a financial account, according to an example embodiment.

Referring now to FIG. 7, a method 700 for generating a scope and budget associated therewith and managing the budget and scope is shown, according to an example embodiment. In various embodiments, the method 700 is performed by the components of system 100 shown in FIG. 1 such that reference may be made to components of FIG. 1 to aid the description of method 700. In some arrangements, through the method 700, the provider computing system 102 and/or retailer computing system 106 receives a budget and a scope associated therewith, monitors various financial transactions and/or actions of a user, and issues alerts and/or recommendations to the user based on the budget, scope, financial transactions, and/or actions of the user. In various arrangements, the method 700 is performed by the provider computing system 102. In other arrangements, the method 700 is performed by the provider computing system 102 in communication with the retailer computing system 106.

An exemplary implementation of the method 700 is a financial account setting including one or more established scopes and budgets associated with the financial account. An account holder identifies scopes and sets a budget associated with each scope to monitor expenditures under each scope. Based on various purchases and other expenditures, the remaining funds associated with each budget and scope are adjusted to reflect each purchase. Accordingly, if a purchase by the user does not fall under an identified scope, then the user is prompted and/or recommended to reconsider the purchase. In some arrangements, the method 700 provides a solution for the joint account holders of joint-holder accounts (e.g., an account that have more than person associated with the account) to continuously monitor expenditures of a particular account.

A scope is received at step 702. In various embodiments, the scope is received by the provider computing system 102 from the user device 104. In some embodiments, the scope includes information such as one or more scope merchant categories of items that one or more account holder wishes to allocate funds to such as groceries, rent, clothing, car payment, and various bills. In various arrangements, the scope received is associated with one or more specific account holders of joint-holder account. For example, only account holder associated with the joint-holder account takes public transportation to work. Accordingly, a scope consisting of public transportation is correlated with the specific account holder. In other arrangements, the scope received is correlated with all account holders of a join-holder account.

A budget associated with a scope is received at step 704. In various embodiments, the budget is received by or the provider computing system 102 from the user device 104. The budget received at step 202 includes various information such as an amount of funds allocated to the scope and an identification of one or more account holders who generated the budget. In some arrangements, various threshold values are received with the budget. The various threshold values indicate a numerical value when a notification (e.g., an alert, a warning) is presented to the one or more account holders to notify the one or more account holders of an account budgetary status. In various arrangements, the threshold values define a depletion value indicating a notification to be sent to the account holders when the remaining funds for a particular scope/budget are less than the depletion value. In other arrangements, the threshold values define a purchase value indicating a notification to be sent to the account holders when a purchase greater than the purchase value is received by the provider computing system 102.

A decision indicating whether a user desires to input additional scopes is presented at step 706. If a user indicates that he/she desires to input additional scopes, then the method 700 can repeat step 702 and step 704. If a user indicates that he/she does not desire to input additional scopes, then the method 700 continues to step 708.

A signal based on the scope and/or budget is received in step 708. In general, the signal received at step 708 indicates a transaction (e.g., a purchase, funds expensed) by one or more account holders. In some arrangements, the signal is transmitted from the user device 104 to the provider computing system 102. In various arrangements, the signal received at step 708 is transmitted from the retailer computing system 106 to the provider computing system 102. In such arrangements, the signal is indicative of a transaction completed at a retailer location (e.g., a physical store).

The signal received is correlated with one or more particular received scope at step 710. For example, if the transaction indicates that food items were purchase, then the transaction details are associated with a grocery budget. In various embodiments, correlating the signal with one or more scopes involves decoding the signal to determine individual items or components of the signals in order to correlate each individual item or component with a particular scope. For example, a signal received indicates a transaction purchase of a loaf of bread and a shirt. Accordingly, the loaf of bread purchase details (e.g., cost) are correlated with a grocery scope while the shirt purchase details are correlated with a clothing scope.

The remaining funds in the budget associated with the correlated scope are calculated at step 712. The remaining funds in the budget can be determined by subtracting the cost of one or more items in the received signal from a previous remaining budget amount. The calculated remaining funds are used to determine if the amount of funds remaining are below a predetermined threshold at step 714. In some embodiments, a predetermined threshold defines a remaining funds value at which a user is notified (e.g., via an alert, via a warning) that the funds withdrawn from a particular budget has reduced to the defined value. As such, the predetermined threshold may be configurable based on user preference. For example, a user may define the predetermined threshold for a particular budget with a value of $100. Accordingly, once the remaining funds in the particular budget reduces to $100, the user is notified of the remaining budget funds. If it is determined that the remaining funds associated with a budget are not below the predetermined threshold value, then the method 700 returns to repeat step 708. Conversely, if it is determined that the remaining funds are below the predetermined threshold value, then the method 700 continues with step 716.

A depletion decision is presented at step 716 representing a decision whether the funds allocated to a particular budget have been depleted (e.g., all funds have been spent). If, at step 716, it is determined that the budget has not been depleted (e.g., there is still an amount of funds remaining in the budget, but the amount of funds is below the threshold value), then an alert is presented to the one or more account holders at step 718. In such arrangements, the alert is a notification indicating that the funds of the particular budget are approaching zero. Conversely, if, at step 716, it is determined that the budget has been depleted (e.g., there are no funds remaining in the budget), then a warning is presented the one or more account holders at step 720. In such arrangements, the warning is a notification indicating that there no remaining funds for the particular budget. Further, the warning presented at step 720 can disable purchasing of items for the particular budget/scope such that transactions including items associated with the particular budget/scope are declined.

Upon the alert being issued at step 718 or the warning being issued at step 720, alternate solutions are recommended to the one or more account holders. In general, alternate solutions provide options for the one or more account holders to pursue in order to remedy the budgetary violation determined in step 716. In various arrangements, the alternate solutions include options to transfer funds from other identified scopes to the scope of the violated budget.

Figure 8:
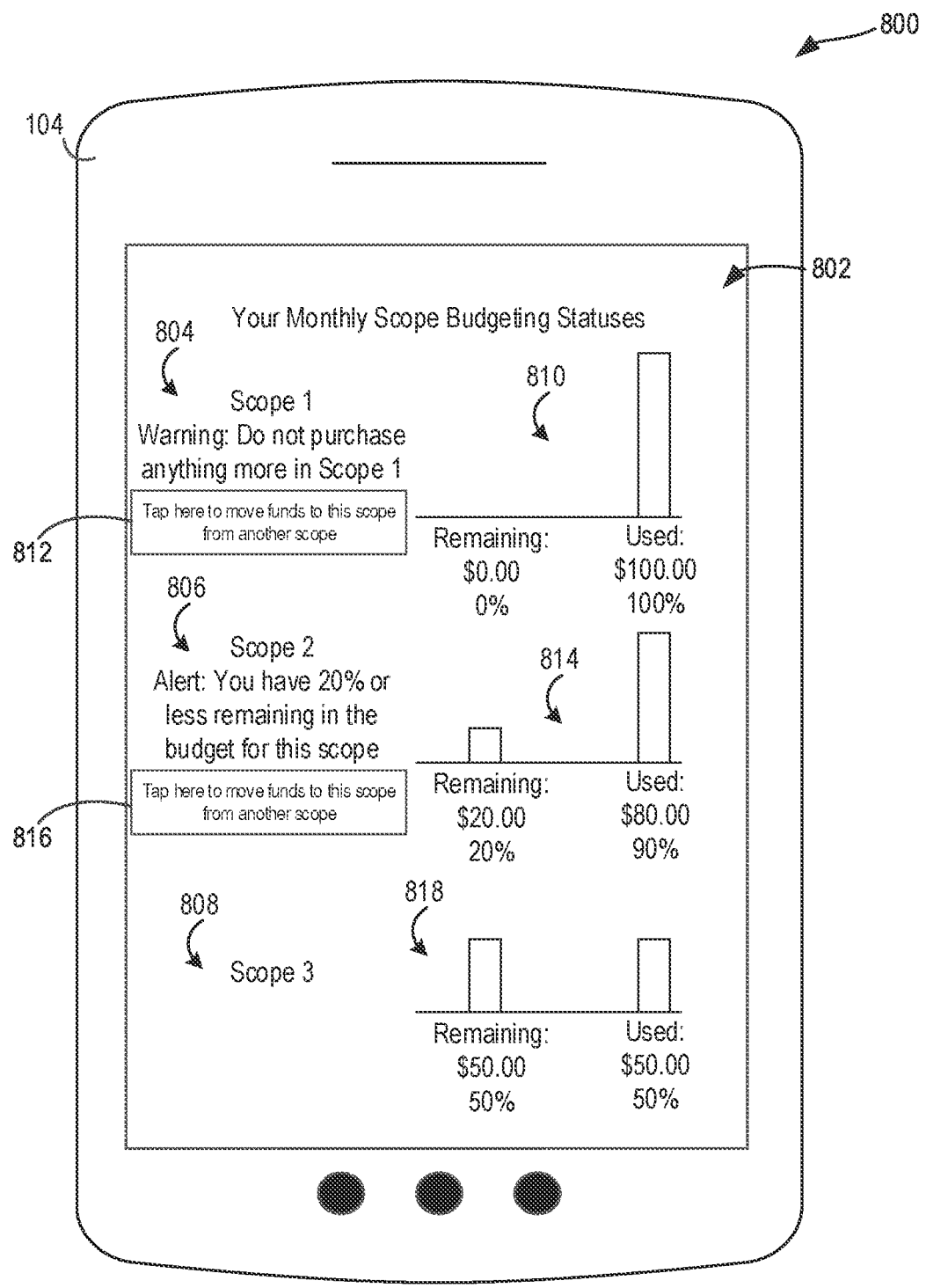
FIG. 8 is a schematic drawing depicting an example user interface of the user device in the system of FIG. 1 for managing multiple scopes, according to an example embodiment.

Referring now to FIG. 8, an example user interface 800 of the user device 104 (shown as a smartphone) presenting a scope status interface 802 is shown, according to an example embodiment. The user interface 800 is an example of an interface generated when an account holder wishes to view information about the current status of generated budgets and/or scopes. In various arrangements, the scope status interface 802 is generated via the client application circuit 134 using account information retrieved from the account database 124. In particular, the scope status interface 802 is an example interface generated for an account with a single account holder. An example arrangement for a joint-holder account with multiple account holders will be described in greater detail with reference to FIG. 9.

The scope status interface 802 is shown to include a first scope 804, a second scope 806, and a third scope 808. In various arrangements, the scope status interface 802 presents fewer or additional scopes based on the number of scopes generated by the user associates with user device 104. Referring specifically to first scope 804, a warning advising the user to not purchase any additional items that fall under the realm of items defined by first scope 804. More specifically, the first scope graph 810 indicates that the entire budget of first scope 804 has been used (as shown by the 100% used bar). Based on the warning presented with first scope 804, the user is presented an option 812 to transfer funds from another scope (e.g., second scope 806, third scope 808) to the funds allocated to first scope 804. Accordingly, upon transferring funds to the first scope 804, the amount of funds transferred are subtracted from the corresponding scope from which the funds were transferred.

Referring specifically to second scope 806, an alert is presented indicating that remaining funds for the budget associated with second scope 806 are below a threshold value. More specifically, the second scope graph 814 indicates that the budget of second scope 806 has 20% remaining in the budget associated with the second scope 806. As previously described, the threshold amount of budget remaining at which the alert is present is configurable based on user input. For example, a user can customize an alert to be present when there is 40% or less of a certain budget remaining. Based on the alert presented with the second scope 806, the user is presented an option 816 to transfer funds from another scope (e.g., third scope 808) to the funds allocated to the second scope 806. Accordingly, upon transferring funds to the second scope 806, the amount of funds transferred are subtracted from the corresponding scope from which the funds were transferred. Referring specifically to third scope 808, no warning is presented to the user. As indicated by the third scope graph 818, the user has used 50% of the funds allocated to the third chart.

Figure 9:
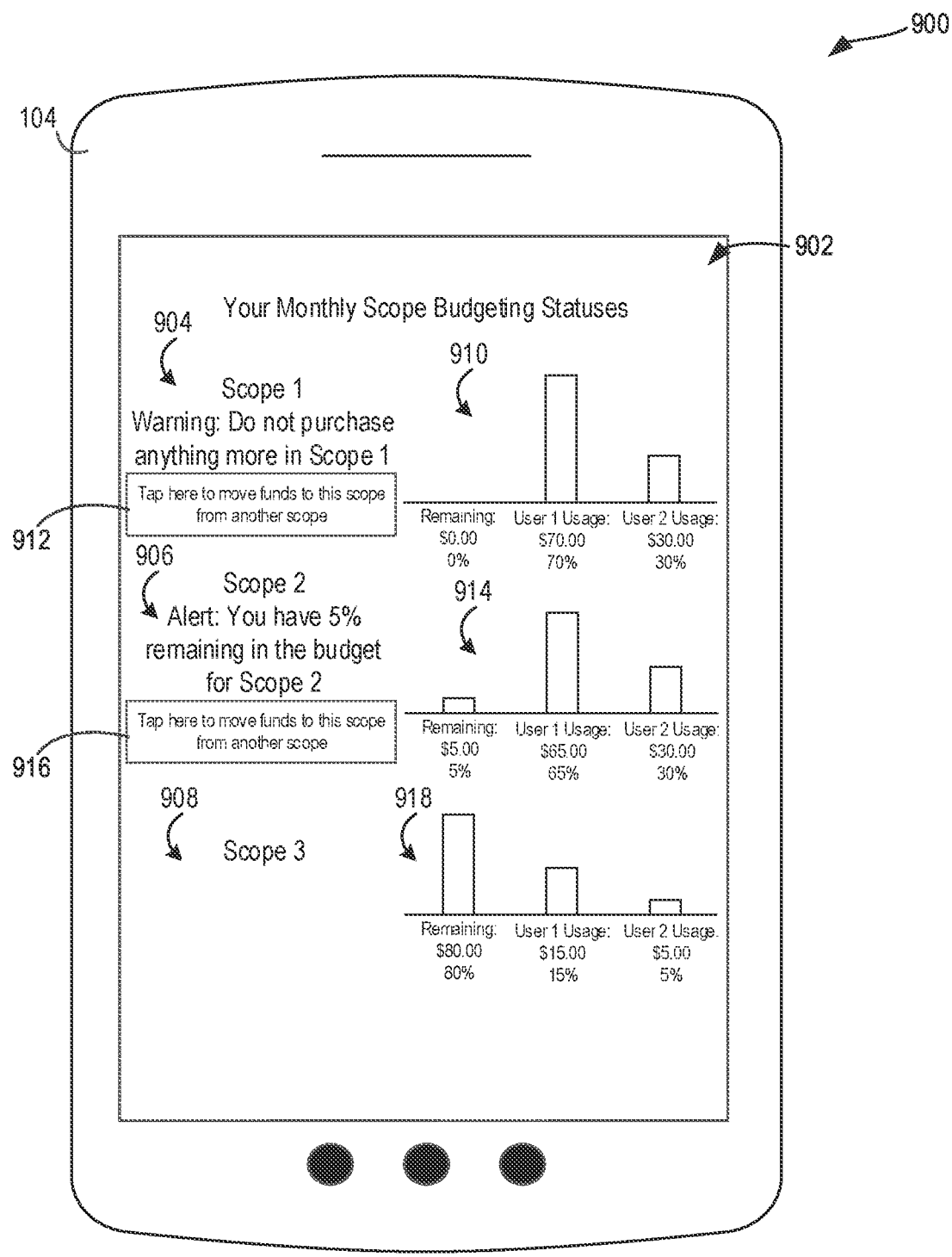
FIG. 9 is a schematic drawing depicting an example user interface of the user device in the system of FIG. 1 for managing multiple scope of a joint-holder account, according to an example embodiment.

Referring now to FIG. 9, an example user interface 900 of the user device 104 (shown as a smartphone) presenting a joint-account scope status interface 902 is shown, according to an example embodiment. The user interface 900 is an example of an interface generated when one or more account holders wish to view information about the current status of generated budgets and/or scopes. In various arrangements, the scope status interface 902 is generated via the client application circuit 134 using account information retrieved from the account database 124. In particular, the joint-account scope status interface 902 is an example interface generated for a joint-holder account with more than one account holder.

The scope status interface 902 is shown to include a first scope 904, a second scope 906, and a third scope 908. In various arrangements, the user interface 900 presents fewer or additional scopes based on the number of scopes generated by the joint-account holders associated with the particular account on user device 104. Referring specifically to first scope 904, a warning advising the joint account holders to not purchase any additional items that fall under the realm of items defined by first scope 904. More specifically, the first scope graph 910 indicates that the entire budget of first scope 904 has been used. Further, the first user is shown to have used 70% of the budget allocated to the first scope 904 and the second user is shown to have used 30% of the budget allocated to the first scope 904. Based on the warning presented with first scope 904, the account holders are presented an option 912 to transfer funds from another scope (e.g., second scope 906, third scope 908) to the funds allocated to first scope 904. Accordingly, upon transferring funds to the first scope 904, the amount of funds transferred are subtracted from the corresponding scope from which the funds were transferred.

Referring specifically to second scope 906, an alert indicating that remaining funds for the budget associated with second scope 906 are below a threshold value. More specifically, the second scope graph 914 indicates that 5% of the budget of second scope 906 is remaining. Further, the first user is shown to have used 65% of the budget allocated to the second scope 906 and the second user is shown to have used 30% of the budget allocated to the second scope 906. Based on the warning presented with second scope 906, the account holders are presented an option 916 to transfer funds from another scope (e.g., third scope 908) to the funds allocated to second scope 906. Accordingly, upon transferring funds to the second scope 906, the amount of funds transferred are subtracted from the corresponding scope from which the funds were transferred.

Referring specifically to third scope 908, no warning is presented to the account holders. As indicated by the third scope graph 918, the budget associated with third scope 908 has 80% of the total funds remaining. Further, the first user is shown to have user 15% of the budget allocated to the third scope 908 and the second user is shown to have used 5% of the budget allocated to the third scope 908.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computing system comprising one or more processors configured to:
    establish, via a network, a secure communication session with an application executing on a user device;
    receive, using the secure communication session via the network, a first scope and a budget from a user device, wherein the first scope and the budget relate to a purchase;
    determine a merchant category for items offered for sale by a merchant that match the first scope;
    receive, from the application using the secure communication session via the network, a selection of an item offered for sale by the merchant;
    determine a particular user associated with the selection of the item, wherein the particular user is at least one account holder associated with a multiple holder account determined by an account linkage circuit of the computing system;
    determine an item merchant category and compare the item merchant category of the item to the merchant category;
    determine a cost of the item and compare the cost of the item to the budget to determine if the cost of the item is less than or equal to a maximum amount of funds available for the purchase based on the budget;
    generate a warning if the cost of the item is greater than the maximum amount of funds available for the purchase;
    provide, to the application using the secure communication session via the network, a prompt that indicates a region associated with the first scope in a map of a location of the merchant presented in the application executed at the user device; and
    provide, to the application using the secure communication session via the network, responsive to an interaction at the application executed at the user device, a second prompt that indicates the maximum amount of funds available for the first scope has fallen below a threshold, the second prompt including an interactive interface element that, when interacted with, causes the computing system to move funds from a second scope into the first scope.

2. The system of claim 1, wherein the one or more processors are further configured to interpret the budget to determine the maximum amount of funds available for the purchase.

3. The system of claim 1, wherein the one or more processors are configured to generate a warning if the item merchant category of the item is not within the merchant category.

4. The system of claim 1, wherein the one or more processors are configured to recommend at least one financing option, wherein the at least one financing option is determined based on a value difference between the cost of the item and the maximum amount of funds available for purchase.

5. The system of claim 1, wherein the one or more processors are configured to recommend an upgrade of the item if the cost of the item is less than the maximum amount of funds available for purchase.

6. The system of claim 1, wherein the one or more processors are configured to determine a remaining amount associated with the maximum amount of funds available for purchase, wherein the remaining amount is determined by subtracting the cost of the item from the maximum amount of funds available for purchase.

7. A computer-implemented method, comprising:
    establish, via a network, a secure communication session with an application executing on a user device of a user;
    receiving, by a computing system, using the secure communication session via the network, a first scope defining a merchant category for items offered for sale by a merchant that match the first scope;
    determining, by the computing system, if a selected item by the user is within the merchant category and a cost of the selected item is equal to or less than a maximum amount of funds available for a user to spend on the merchant category;
    determining, by the computing system, a particular user associated with a selection of the selected item, wherein the particular user is at least one account holder associated with a multiple holder account determined by an account linkage circuit of the computing system;
    issuing, by the computing system, using the secure communication session via the network, at least one warning indicating a particular item selected by the particular user does not fall within the merchant category and the cost of the selected item is greater than the maximum amount of funds available;
    recommending, by the computing system, one or more alternate solutions to the particular user, wherein the one or more alternate solutions are at least within the merchant category and at least equal to or less than the maximum amount of funds available;
    providing, by the computing system, using the secure communication session via the network, a prompt that indicates a region associated with the one or more alternate solutions in a map of a location of the merchant presented in the application executed at the user device of the particular user; and
    providing, by the computing system, using the secure communication session via the network, responsive to an interaction at the application executed at the user device, a second prompt that indicates the maximum amount of funds available for the first scope has fallen below a threshold, the second prompt including an interactive interface element that, when interacted with, causes the computing system to move funds from a second scope into the first scope.

8. The method of claim 7, further comprising receiving, by the computing system, using the secure communication session via the network, a budget defining the maximum amount of funds available for the user to spend on the merchant category.

9. The method of claim 8, further comprising linking the first scope and the budget to a financial account of the user of the user device.

10. The method of claim 7, wherein recommending one or more alternate solutions to the user comprises recommending at least one financing option, wherein the at least one financing option is determined based on a value difference between the cost of the selected item and the maximum amount of funds available.

11. The method of claim 7, further involving recommending an upgrade of the selected item if the cost of the selected item is less than the maximum amount of funds available.

12. The method of claim 7, further involving determining a remaining amount associated with a budget, wherein the remaining amount is determined by subtracting the cost of the selected item from the maximum amount of funds available.

13. A user device comprising:
a network interface configured to facilitate data communication via a network; and
a processing circuit comprising a processor and memory, the processing circuit configured to transmit information to at least one of a provider computing system and a retailer computing system, wherein the information comprises a first scope and a budget, wherein the processing circuit comprises:
a client application circuit structured to generate the first scope and the budget, and further structured to:
display a prompt received, using a secure communication session via the network, from the provider computing system that indicates a region associated with the first scope in a map of a location associated with the retailer computing system presented by the client application circuit, wherein the budget is associated with the first scope, wherein the first scope defines a merchant category to which a maximum amount of funds available is allocated; and
display, responsive to an interaction, a second prompt that indicates the maximum amount of funds available for the first scope has fallen below a threshold, the second prompt including an interactive interface element that, when interacted with, causes the provider computing system to move funds from a second scope into the first scope;
a provider application circuit configured to receive, using the secure communication session via the network, the first scope and the budget, wherein the provider application circuit is configured to link an account with the user device;
a location position sensor configured to collect location information of the user device; and
an input device structured to facilitate user interaction with the user device.

14. The user device of claim 13, wherein the client application circuit is configured to receive the location information from the location position sensor and use the location information to determine a location of the user device in a retailer location.

15. The user device of claim 14, wherein the client application circuit is configured to transmit a notification based on determining from the location information that the user device is located outside an acceptable region with the retailer location.

16. The user device of claim 13, wherein the client application circuit is configured to receive, using a secure communication session via the network, product data indicating one or more items from the input device and determine, based on the product data, if each of the one or more items are within the first scope.

17. The user device of claim 16, wherein the client application circuit is configured to transmit a notification based on determining from the product data that at least one of the one or more items is outside of the first scope.

18. The user device of claim 13, wherein the provider application circuit is configured to receive a signal indicating a transaction, wherein the provider application circuit determines a correlated one of the first scope to which the transaction relates.

19. The user device of claim 13, wherein the provider application circuit is configured to determine an expenditure correlating to each account holder of a joint-holder account related to each of the first scope, wherein the expenditure defines an amount spent by a particular account holder.

20. The user device of claim 13, wherein the maximum amount of funds available is defined by the budget.

* * * * *